Nov. 22, 1927.

K. SPILLNER

GUARD AND SAFETY DEVICE FOR MOTOR DRIVEN VEHICLES

Original Filed May 27, 1926

1,649,930

Inventor
Karl Spillner.

Witnesses

Patented Nov. 22, 1927.

1,649,930

UNITED STATES PATENT OFFICE.

KARL SPILLNER, OF HAMBURG, GERMANY.

GUARD AND SAFETY DEVICE FOR MOTOR-DRIVEN VEHICLES.

Application filed May 27, 1926, Serial No. 112,099, and in Germany July 6, 1925. Renewed October 15, 1927.

The invention relates to guards and safety devices for motor driven vehicles, of the kind in which a flexible buffer screen carried by the vehicle body is connected with a flexible fender or catcher affixed to the vehicle body by means which, when an obstacle is struck by the screen, effect the release of the fender and allow it to swing down in front of the vehicle. According to the invention, in addition to the known hook connection after the release of which the fender is swung down in front of the vehicle, a chain connection between the buffer screen and the fender has been provided, which becomes operative after the hook connection is released and will lift the foremost extremity of the fender when the buffer screen has receded.

Compared with similar known arrangements, the present construction offers the advantage that the fender will descend in front of the vehicle but not as far as the track itself, and that, after being swung down it is raised and swings freely above the roadway.

In the accompanying drawings:—

The apparatus consists in the main of a flexible screen carried at the front of the vehicle and a fender co-operating therewith.

Figure 1:
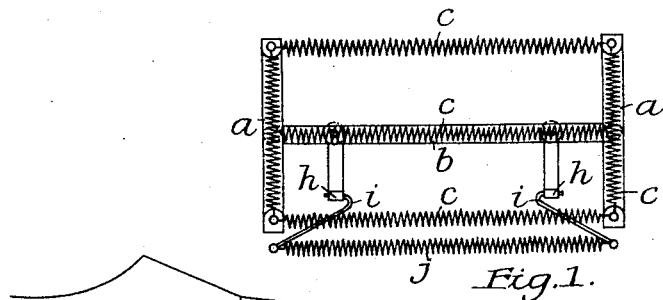
Figure 1 illustrates in front elevation the screen and fender separated from the vehicle.

The screen is formed by two lateral stays $a$, a transverse rail $b$ connecting these stays at the centre, and spiral springs $c$ stretched between the stays $a$ in the manner shown in Figure 1.

This screen is longitudinally guided in the underframe of the vehicle by means of buffer rods $d$ extending rearwardly from the transverse bar $b$, these rods being constantly pressed forwardly by springs $e$.

When an obstacle is struck, the rods $d$ slide back in their guides against the action of the springs $e$, and come into contact with buffers $f$ which are constantly pressed forward by springs $g$. The buffers $f$ thus counteract the pressure exerted upon the rods $d$.

Figure 2:
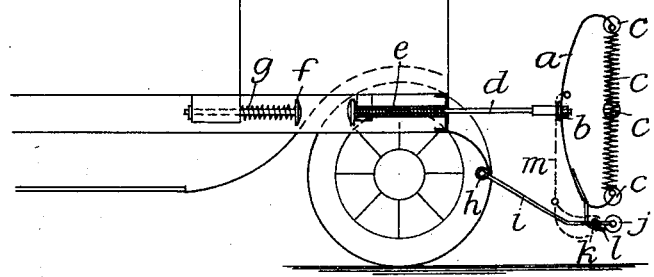
Figure 2 is a side elevation of the screen and fender affixed to a vehicle in the position in which it is ready for action.

The fender co-operating with the screen comprises two side arms $i$ movably mounted in a member $h$ on the underframe of the vehicle, the forwardly extended free ends of the said arms being connected with each other by a spiral spring $j$. Near the ends of the arms $i$ are fitted projections $k$ which, in the manner shown in Figure 2, are engaged by hooks $l$ carried by the screen, the fender being thus held above the track at a level which will not affect the running of the car.

Figure 3:
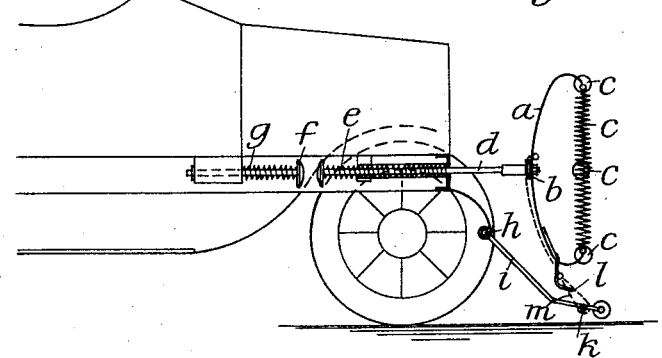
Figure 3 illustrates the apparatus at the moment of striking an obstacle.
Figure 4:
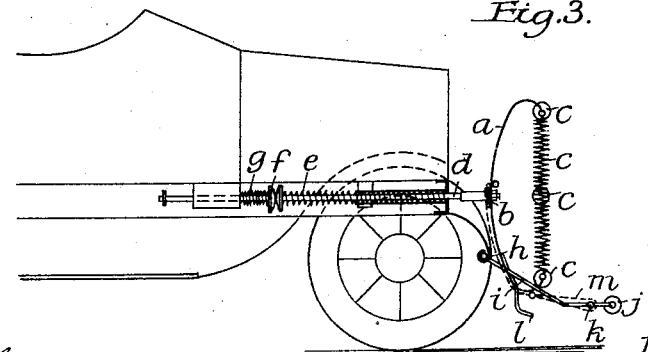
Figure 4 shows the apparatus after catching the obstacle.

According to the invention, a connection additional to that effected by the hooks $l$ is provided between the screen and the fender. This additional connection is in the form of chains $m$ secured to the transverse rail $b$ of the screen and looped around the projections $k$ of the fender. The chains are slack in the normal position of the apparatus as illustrated in Figure 2, and the arrangement is so devised that during the pushing back of the rods $d$ the fender will first be released by the hooks $l$ and descend towards the track, (Figure 3), and subsequently be swung upwards by the tightening of the chains $m$ on further rearward movement of the rods $d$, to the position shown in Figure 4.

The swinging of the fender first downwardly and then upwardly is of the utmost importance for the usefulness of the invention, because a person striking the screen will be properly caught and securely held.

What I do claim as my invention and desire to secure by Letters Patent is:—

1. The combination with the underframe of a motor vehicle, of a buffer screen adapted to move rearwardly on striking an obstacle, a fender pivotally connected at its rearward end to said frame, a support for the forward end of the fender adapted to be withdrawn by rearward movement of the screen, and means operative to check the fall of the fender and raise it when said support is withdrawn.

2. The combination with the underframe of a motor vehicle, of a buffer screen adapted to move rearwardly on striking an obstacle, a fender pivotally connected at its rearward end to said frame, projections on the fender, hooks secured to the screen and normally underlying said projections, and a normally slack chain connecting the screen and fender adapted to check the fall of the fender and raise it when the hooks are withdrawn from the projections on rearward movement of the screen.

3. The combination with the underframe of a motor vehicle, of a flexible buffer screen, buffer rods supporting said screen and longitudinally guided in said frame, a flexible fender pivotally connected at its rearward end to said frame, projections on the fender, hooks secured to the screen and normally underlying said projections, and normally slack chains secured to the screen and looped around said projections adapted to check the fall of the fender and raise it when the hooks are withdrawn from the projections on rearward movement of the screen.

4. The combination with the underframe of a motor vehicle, of a buffer screen comprising two side stays, a central transverse rail connecting said stays and spiral springs stretched between the side stays, buffer rods extending rearwardly from the transverse rail and longitudinally guided in the underframe, a flexible fender comprising two side arms pivotally connected at their rearward ends to the underframe and a spiral spring stretched between the forward ends of said arms, projections on said arms, hooks secured to the screen and normally underlying said projections, and normally slack chains secured to the transverse rail and looped around said projections adapted to check the fall of the fender and raise it when the hooks are withdrawn from the projections on rearward movement of the screen.

In witness whereof I have hereunto signed my name this 7th day of May 1926.

KARL SPILLNER.